United States Patent
Hennum et al.

(10) Patent No.: US 7,562,072 B2
(45) Date of Patent: Jul. 14, 2009

(54) APPARATUS, SYSTEM, AND METHOD FOR ENHANCING HELP RESOURCE SELECTION IN A COMPUTER APPLICATION

(75) Inventors: Erik Frederick Hennum, San Francisco, CA (US); Matthew Paul Laroche, Palo Alto, CA (US); Eric Benjamin Munson, Hillsboro, OR (US); Goss Franklin Nuzzo-Jones, Bedford, VA (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 11/420,440

(22) Filed: May 25, 2006

(65) Prior Publication Data

US 2007/0277104 A1 Nov. 29, 2007

(51) Int. Cl.
*G06F 17/30* (2006.01)
(52) U.S. Cl. .............................................. 707/3; 707/5
(58) Field of Classification Search ...................... 707/3, 707/2, 102, 200, 5; 718/102; 358/3.29
See application file for complete search history.

(56) References Cited

U.S. PATENT DOCUMENTS

| | | | |
|---|---|---|---|
| 6,347,943 B1 | 2/2002 | Fields et al. ................. 434/118 |
| 6,643,369 B1 | 11/2003 | Biebesheimer et al. ......... 707/3 |
| 6,675,149 B1 | 1/2004 | Ruffin et al. .................... 705/8 |
| 6,701,311 B2 | 3/2004 | Biebesheimer et al. ......... 707/5 |
| 6,748,387 B2 | 6/2004 | Garber et al. ................. 707/10 |
| 6,873,990 B2 | 3/2005 | Oblinger ..................... 707/101 |
| 7,181,438 B1 * | 2/2007 | Szabo ............................ 707/2 |
| 2002/0143643 A1 | 10/2002 | Catan .......................... 705/26 |
| 2003/0084087 A1 * | 5/2003 | Berry ......................... 709/102 |
| 2006/0206460 A1 * | 9/2006 | Gadkari .......................... 707/3 |
| 2007/0223045 A1 * | 9/2007 | Schmouker et al. ........ 358/3.29 |

OTHER PUBLICATIONS

Liang Ma et al., "A Predication-Based Approach For Effective Resource Discovery In Tropical Web", Proceedings of IEEE TenCon '02, pp. 61-64.

* cited by examiner

*Primary Examiner*—John R. Cottingham
*Assistant Examiner*—Sherief Badawi
(74) *Attorney, Agent, or Firm*—Kunzler & McKenzie (57) ABSTRACT

An apparatus, system, and method are disclosed for enhancing help resource selection for a user that accesses a help function within a computer application. The method of enhancing the help resource selection comprises determining a list of help resources applicable to the current context of the user interaction with the computer application and the help feature. Then, the method ranks applicable help resources according to relevance criteria set by the practitioner of the invention. For example, the practitioner may wish to provide certain help resources based upon the skill level of the user and whether the user has accessed specific help resources in the past. The method would preferentially select those help resources that matched the user skill level and past access criteria set by the practitioner.

4 Claims, 9 Drawing Sheets

APPARATUS, SYSTEM, AND METHOD FOR ENHANCING HELP RESOURCE SELECTION IN A COMPUTER APPLICATION

BACKGROUND OF THE INVENTION

1. Field of the Invention

This invention relates to providing help content for the user of a computer-based application, especially for providing content tailored for the help access context and the characteristics of the specific user.

2. Description of the Related Art

Help files and electronic documentation are used extensively for complex computer-based applications. Help content provided in this format is highly desirable because it makes the content immediately available to the user. Presently available help resources are referenced absolutely—for example the user may highlight a keyword and the help application looks up the content for that keyword, and provides the same information to the user each time. Further, there is no consideration for the particular user within current help file systems.

While current techniques for building and accessing help content are effective, they are labor intensive. Further, the absolute referencing limits the utility of the help content. For example, there may be a penumbra of help resources around a help topic that a user requests help with, but the user will be given the same content each time. Therefore, either useful information must be left out, or the user must be given all of the relevant help content. If the information is left out, the user is left to search through hyperlinks within the help files, if any, or to search through the index, hoping to find the correct link to give them the needed information. The help content provide under current systems could be even more useful if the help file system could be built to consider the current user.

Under the current technology, updating or repeating information causes inefficiencies. For example, if there are several elements of information that must be included to provide a user with full information for a topic, then it is likely that some of those elements are also used elsewhere within the help system. If a shared element is updated at some point, a programmer will have to go find and update each element separately. If that element is added to a new help topic, it must be added manually.

The described limitations of the current technologies could be overcome if the help content could be stripped down to its most basic elements, and those elements could be referenced and updated individually. The help content could be stripped down in this manner if there existed a technology to ensure that the user still received all of the help resources from the penumbra of help resources around each topic. As a help resource selection enhancement, the most basic and relevant resources from the penumbra for a given help topic might be given to the user first, and as the knowledge of the user grew, then more subtle help resources could be given to the user.

Other limitations of the current technology could be overcome if the help content could consider the characteristics of the user. One enhancement would be if the help system simply learned directly from interaction with the user—for example if the user accesses "A" 100 times, then perhaps the user does not need to look at "A" any longer. An even more powerful enhancement would be if the help system could directly access external information about the user—for example it might be relevant to the help content that should be provided that the user is a C++ programmer with 20 years experience, and that information might be somewhere in a database accessible to the help system.

From the foregoing discussion, it should be apparent that a need exists for an apparatus and method that allows help resources to be parsed down to the most basic elements while ensuring the user has all of the information available. Beneficially, such an apparatus and method would allow the help system to learn about the user and to access external information about the user to provide even more specifically tailored help content.

SUMMARY OF THE INVENTION

The present invention has been developed in response to the present state of the art, and in particular, in response to the problems and needs in the art that have not yet been fully solved by currently available electronic documentation. Accordingly, the present invention has been developed to provide an apparatus, system, and method for enhancing help resource selection that overcome many or all of the above-discussed shortcomings in the art.

The apparatus to enhance help resource selection is provided with a plurality of modules configured to functionally execute the necessary steps of receiving a user help access context, determining a help topic from the context, applying criteria of relevance to select a help resource relevant to the user, and providing the selected help resource to the user.

The apparatus, in one embodiment, has a topic module configured to determine a current topic. The current topic might be based on a user help access context. The apparatus may also have a mapping module configured to access a help topic map, and a resource list module configured to determine a list of available help resources from the help topic map and the current topic. The apparatus may further contain a selection logic module configured to calculate a selection index value for each help resource, and to select one of the help resources from the list of available help resources. The calculation of the selection index value may be based upon various criteria of relevance that are assigned by the practitioner of the invention to support the goals of the particular embodiment of the invention.

In a further embodiment, the selection logic module may generate an ordered list of the help resources from the list of available help resources based upon the selection index values for the help resources. In one embodiment, this would allow a user interface module to be configured to provide multiple help resources to the user, perhaps with a primary resource listed in full, and brief hyperlinks to a few other highly relevant resources included.

In a further embodiment, the selection logic module may include a resource tracking module which counts the number of times a user accesses each help resource and records these values as user access numbers. The selection logic module may be configured to make help resources with lower user access numbers more likely to be selected, or the selection logic module may be configured to automatically select help resources with lower user access numbers. This makes the invention more likely to display a variety of help resources to the user rather than repeat help resources that are probably already known to the user.

The apparatus may be further configured to include external data when determining which help resources are displayed to the user. The selection logic module may contain a supplemental data module configured to access various sets of external data to enhance the selection logic and make it more useful to the user. For example, the external data may comprise a user knowledge value of "beginner," "advanced,"

or "expert," and the selection logic module may tailor which help resources are selected based upon the user knowledge value.

A system of the present invention is also presented to enhance help resource selection. The system may be embodied in a computer for the user to access an application which the help resources serve. The system may further include a help access context which passes from the computer to a memory device. The memory device may reside on a server which the computer is connected to, or the memory device may exist within the computer itself. The memory device may comprise a set of stored data which may contain relationships between the help access context and various related help topics. The memory device may further comprise a set of criteria of relevance. The criteria of relevance may be set according to the goals of the practitioner creating the particular embodiment of the invention. The system may further include a resource selection tool, which may contain an apparatus configured to enhance help resource selection in accordance with the present invention.

A method of the present invention is also presented for enhancing help resource selection. The method in the disclosed embodiments substantially includes the steps necessary to carry out the functions presented above with respect to the operation of the described apparatus and system. In one embodiment, the method includes determining a current topic, accessing a help topic map, determining a list of available help resources from the current topic and help topic map, calculating at least one resource selection index value for each available help resource, selecting at least one help resource, and providing the selected resource for access by a user.

In a further embodiment, the method includes calculating relevance values from the selection index values, and generating an ordered list of available help resources. In a further embodiment, the method includes selecting help resources based by selecting the most relevant help resource, or by selecting a random help resource but biasing the selection such that more relevant resources are more likely to be selected. In one embodiment, the method determines selection index values based upon user access numbers for the available help resources. In one embodiment, the method determines selection index values based upon external data such as a user skill list.

In a further embodiment, the method includes selecting several of the most relevant available help resources. The method may further include displaying the most relevant help resource in full for the user, and displaying brief versions of the next several most relevant help resources for the user to easily access if desired.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
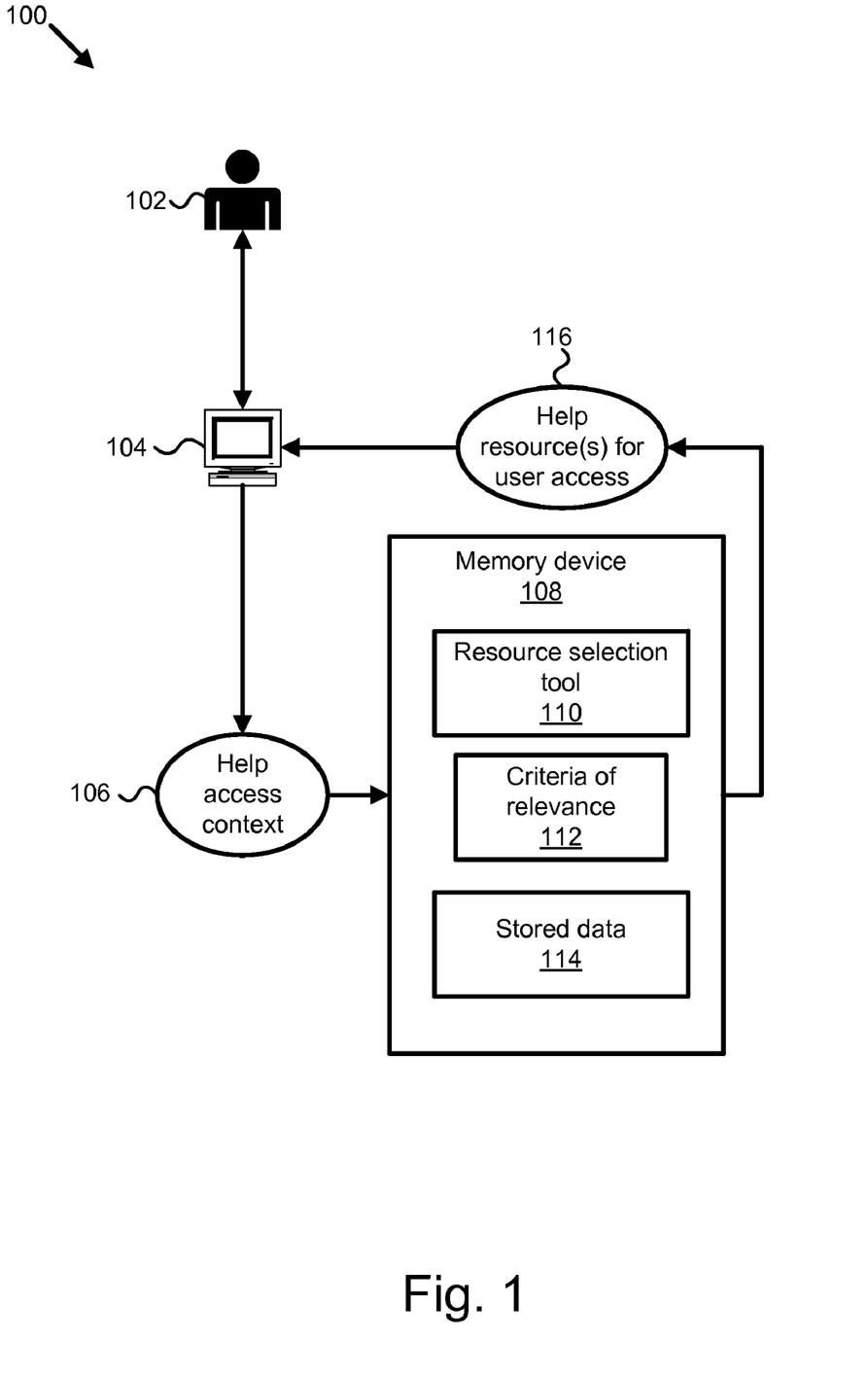
FIG. 1 is a schematic block diagram illustrating one embodiment of a system to enhance help resource selection in accordance with the present invention.

FIG. 1 depicts a system 100 for enhancing help resource selection for the user 102 of a computer application. The user 102 may access the system 100 through a computer 104, terminal, or the like. The user 102 may activate a help feature on the computer 104, which provides a memory device 108 with the help access context 106. The help access context 106 is a general term comprising the circumstances of the user 102 access to the help feature. For example, the help access context 106 might be a keyword, a page number within an application file, a field number for the active field from the application, various application metadata (e.g. this is the first time this application has been used), and so forth.

The memory device 108 may receive the context 106 and provide it to a resource selection tool 110. The resource selection tool 110 may be configured to access criteria of relevance 112, and stored data 114, and select a help resource. The stored data 114 is shown in the memory device 108 for clarity, although the stored data 114 could be stored anywhere that is accessible to the resource selection tool 110—for example, in another memory device over a network. Likewise, the memory device 108 need not be separate from the computer 104 as shown, the memory device 108 is shown separately for better clarity.

The memory device 108 provides the selected help resource as the help resource for user access 116. A help resource is an element of help content which may be useful to the user. For example a user may be filling out a tax form for a tax filing program, and select the help function when the user is within the Earned Income Credit field. The context 106 might be {Tax Program, Form page 6, Field EIC Selected}, and one example of a help resource related to that context 106 might be an explanation of the law around the Earned Income Credit. The help resource for user access 116 could be the help resource itself, or it could merely be some pointer to the selected help resource where the computer 104 utilizes that pointer to find and display the appropriate help resource to the user 102.

The criteria of relevance 112 may be used by the resource selection tool 110 to determine the appropriate help resource for selection. The criteria of relevance 112 allow the practitioner of the invention to effect particular selection strategies and will be described more specifically below in FIGS. 2 and 3. For example, the criteria of relevance 112 might be the number of times the user 102 has accessed each help resource, if the practitioner's selection strategy was to make help resources less likely to be selected the more times the user 102 has accessed them.

The stored data 114, in one embodiment, stores data that supports the resource selection tool 110. For example, the stored data 114 might comprise a list of contexts 106 associated with help resources, such that the resource selection tool 110 can generate a list of appropriate help resources according to the help access context 106. In an embodiment where the memory device 108 contains the entire content of each help resource rather than just pointers, the content of the help resources might be in the stored data 114.

Figure 2:
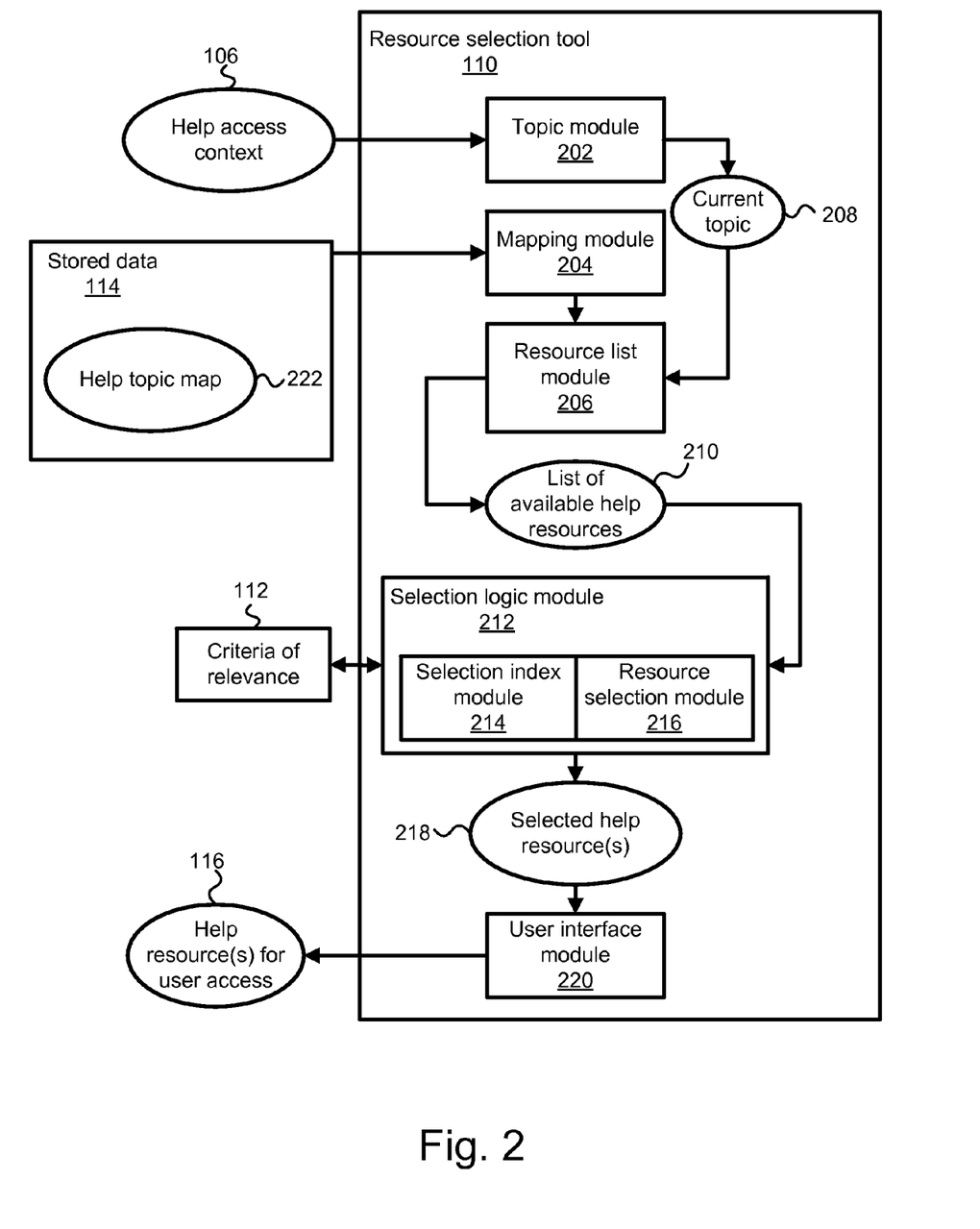
FIG. 2 is a schematic block diagram illustrating one embodiment of an apparatus to enhance help resource selection in accordance with the present invention.

FIG. 2 depicts an apparatus comprising a resource selection tool 110 in accordance with the present invention. In one embodiment, the resource selection tool 110 is configured to receive a help access context 106, to read stored data 114, to read criteria of relevance 112, and to provide a help resource for user access 116.

The selection tool 110 may have a topic module 202 configured to receive the help access context 106, and to determine a current topic 208 according to the context 106. The topic module 202 may be configured to look the context 106 up in a list to determine the current topic 208, or the topic module 202 may be configured to provide the context 106 directly, in whole or part, as the current topic 208. For example, if the context 106 is {Tax Program, Form page 6, Field EIC Selected}, the topic module 202 may use a lookup table to determine that a context 106 with these values is topic number 66146. In an alternate example with the same context 106, the topic module 202 may be configured to pass the value of the third field from the context 106 as the current topic 208 (i.e. "Field EIC Selected").

Figure 8:
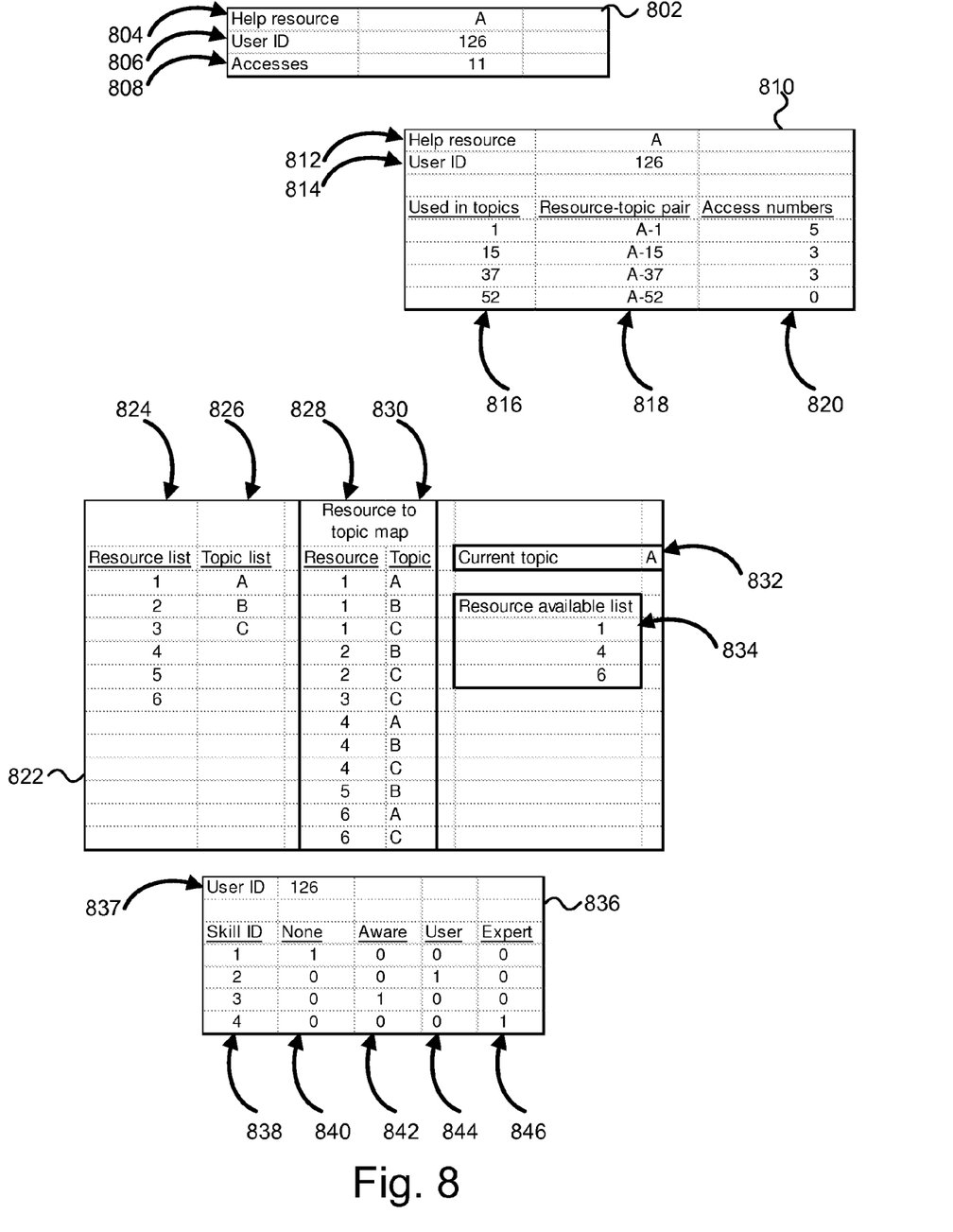
FIG. 8 is an illustration of a user access number, an alternative user access number, a help topic map, and external data in accordance with the present invention.

The selection tool 110 may further include a mapping module 204. The mapping module 204 may access the stored data 114 and read in the help topic map 222. The help topic map is a referential data list that associates help resources with topics. In one embodiment, the help topic map will comprise a list of help resources, a list of topics, and a relational list that associates each help resource with at least one topic. Thus, if a current topic 208 is known, the help topic map 222 can be used to determine a corresponding list of help resources 210 that relate to the current topic 208. Refer to FIG. 8 for more details. The mapping module 204 may be further configured to provide the help topic map 222 to the resource list module 206.

The selection tool 110 may further include a resource list module 206. The resource list module 206 may be configured to apply the current topic 208 to the help topic map 222 to determine a list of available help resources 210.

The selection tool 110 may have a selection logic module 212. The selection module 212 may be responsible for selecting one or more help resources from the list 210 of available help resources. In one embodiment, the selection tool 110 comprises a selection index module 214 configured to assign a selection index value to each resource on the list 210, according to the criteria of relevance 112. In the example embodiment, the resource selection module 216 then determines one or more selected help resources 218 from the list 110 according to the index values.

In a preferred embodiment, the relationship between the index value and the relevance of a help resource is such that a high index value indicates a high relevance, although other relationships are within the ordinary skill of one in the art. The resource selection module 216 may select resources based on other criteria than strict relevance—for example, the resource selection module 216 may be configured to favor help resources that the user 102 has not accessed over help resources that the user 102 has already accessed.

A user interface module 220 may take the selected help resource(s) 218 and provide those resources for user access 116. The user interface module 220 may provide a list of hyperlinks for the user 102 to access. In a preferred embodiment, the user interface module 220 provides the full contents of a single selected help resource 218 to the user 102. In a further embodiment, the user interface module 220 provides the full contents of a single selected help resource 218, and provides a list of hyperlinks to other selected help resources 218, where all of the selected help resources 218 are a number of the most relevant help resources given the help access context 106.

Figure 3:
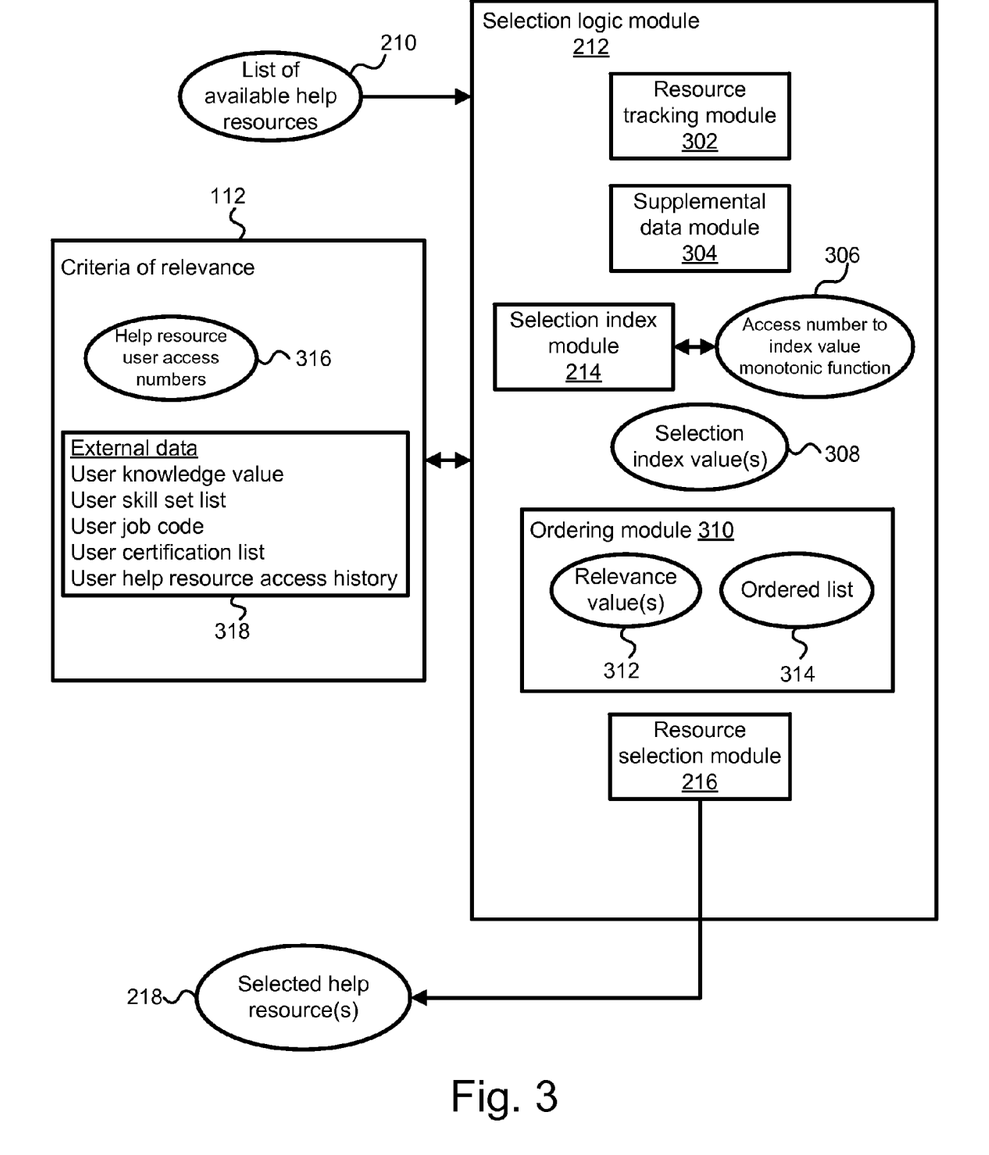
FIG. 3 is a schematic block diagram illustrating one embodiment of a selection logic module in accordance with the present invention.

FIG. 3 illustrates one embodiment of a selection logic module 212 in accordance with the present invention. FIG. 3 adds some specific examples of criteria of relevance 112 to further clarify the present invention.

The criteria of relevance 112 may comprise a set of help resource user access numbers 316. The help resource user access numbers 316 may comprise the number of times a given user 102 has accessed each help resource. For example, if the user 102 has accessed a help resource "How to save a file" five times, then one of the set of help resource user access numbers 316 might be "How to save a file" related to the number five.

The criteria of relevance 112 may further comprise external data 318. This element is named "external data" because in a preferred embodiment, there may be information about the user stored on an external database which the memory device 108 accesses over a network. However, the external data 318 may be saved within the memory device 108 or the computer 104 and need not literally be external. The external data 318 may comprise any type of information that will assist the practitioner of the invention in achieving the goal of getting the most appropriate help content to the user 102. Some examples shown are a user knowledge value, a user skill set list, a user job code, a user certification list, a user job code, a user certification list, and a user help resource access history. These are briefly described below.

The user knowledge value might be a value like "beginner" or "expert" that provides some rudimentary information about the general skill level of the user 102. The user knowledge value might be entered by the user 102, or it might be stored on a record about the user 102 in a database.

The user skill set list might be a list of specific skills, with an indicator of whether the user 102 has the skill, or perhaps even the degree of the particular skill. For example, the user skill set list might have the field "polymorphic C programming" with a value of TRUE or FALSE. Again, this could be a list populated by the user, or stored in a database somewhere.

The user job code might be a value entered by the user or pulled from a database. The user job code could be a value like "marketing representative" or "field engineer" that could then be used to enhance the type of help content selected by the selection logic module 212.

The user certification list may be a list of potential certifications that might be useful in configuring help resource content selection, like "Microsoft® Office Specialist." The user certification list may be entered by the user or stored in a database.

The user help resource access history may be similar to the help resource user access numbers 316. However, the information stored in the user help resource access history may be more robust that then help resource user access numbers 316. For example, the entire context 106 for each access of a help resource by the user 102 might be stored. In one embodiment, the selection logic module might be less likely to display a previously accessed help resource when that user 102 has accessed the help resource in the same context 106. The user help resource access history may also contain the dates of access for help resources, and allow user 102 accesses to expire after a time. One of ordinary skill in the art can readily use the user help resource access history in a number of ways, and these are included within the contemplated scope of the invention.

The selection logic module 212 may include a resource tracking module 302. The resource tracking module 302 may be configured to track the resources accessed by the user 102, and to store the tracking information for subsequent access by the selection logic module 212. The resource tracking module 302 may read from and update the user access numbers 316.

The selection logic module 304 may further comprise a supplemental data module 304. The supplemental data module 304 may be configured to track information relative to the external data 318. For example, the supplemental data module 304 may be configured to prompt the user 102 for a user knowledge value and store that value in the external data 318. The supplemental data module 304 may be configured to read from and update the external data 318.

The selection logic module 212 may include an access number to index value monotonic function 306. The monotonic function 306 may relate user access numbers 316 to selection index values 308 in a manner desired by the practitioner. For example, if the index value 308 should shrink quickly each time the user accesses a resource, then the monotonic function 306 could be something like index=(10,000/accesses). This approach might be favored where the user would be expected to learn a help resource quickly after accessing it just a few times. In another example, if the index value 308 should shrink slowly each time the user accesses a resource, then the monotonic function 306 could be something like index=(1,000−accesses). Note that although the example shows the index shrinking with the number of user accesses, one of skill in the art could readily configure the index to grow with the number of user accesses.

The monotonic function 306 is called monotonic because, in a preferred embodiment, the index value should always grow with more accesses or always shrink with more accesses. One can contemplate a situation where there is a preferred ideal number of accesses, such that the index grows to that point, and shrinks thereafter. One can also contemplate learning a "favorite help resource" where the algorithm shrinks the index with each access, but then beyond a certain number of accesses the index grows because the user 102 has shown a preference for referring to the particular help resource. These embodiments are contemplated within the scope of the invention, but are within the skill of one in the art and are not discussed further.

In one embodiment, the index value provided by the monotonic function 306 is only the user access number 316 contribution to the selection index value 308, and maybe further modified by the selection index module 214 according to the external data 318 contribution before the final selection index value 308 is obtained.

The selection index module 214 determines the selection index values 308 from the external data 318 and the user access number 316. The selection index module 214 may pass a user access number 316 to the monotonic function 306 to receive back the user access number 316 contribution to the selection index value 308. The responses of the selection index values 308 to the external data 318 should support the intentions of the practitioner. For example, a user knowledge value of "expert" might favor complex help resources, and give them a higher selection index value. Certain user certifications may eliminate certain help resources from consideration completely. The exact effects of each external data 318 element depend upon the purpose of including each element, and it is within the skill of one in the art to configure the selection index module 214 accordingly.

The selection logic module 212 may further include an ordering module 310. The ordering module 310, in a preferred embodiment, may be configured to determine a relevance value 312 for each selection index value 308. The primary reasons for the relevance value 312 determination is that the practitioner may equate selection index values 308 to relevance of help resources in an inverse fashion (i.e. low selection index value=high relevance), and the practitioner may want to configure selection index values 308 for better display purposes. For example, the selection index values 308 for one embodiment might go from 1 to 1,000,000, but the practitioner deems it more useful to display relevance as relevance=log(index) to give a possibly more useful value of 0-6 for display.

The ordering module 310 may generate an ordered list 314 of the help resources from the list of available help resources 210. In a preferred embodiment, the ordered list 314 comprises a few of the help resources with the highest relevance values 312. The ordered list 314 can be the entire list of available help resources 210 in order by relevance value 312.

The selection logic module 212 may include a resource selection module 216 configured to select help resources from the ordered list 314, and to provide the selected help resources 218. In one embodiment, the selected help resources 218 is the single help resource with the highest relevance value 312. In an alternative embodiment, the selected help resources 218 is a random selection biased by the relevance values 312, where help resources with a higher relevance value 312 have a higher chance of selection than help resources with a lower relevance value. In another alternative embodiment, the selected help resources 218 is a list help resources from the top the ordered list 314, preferably a number of help resources configured for easy display to the user 102. For example, the resource selection module 216 might select the top ten help resources from the ordered list 314.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
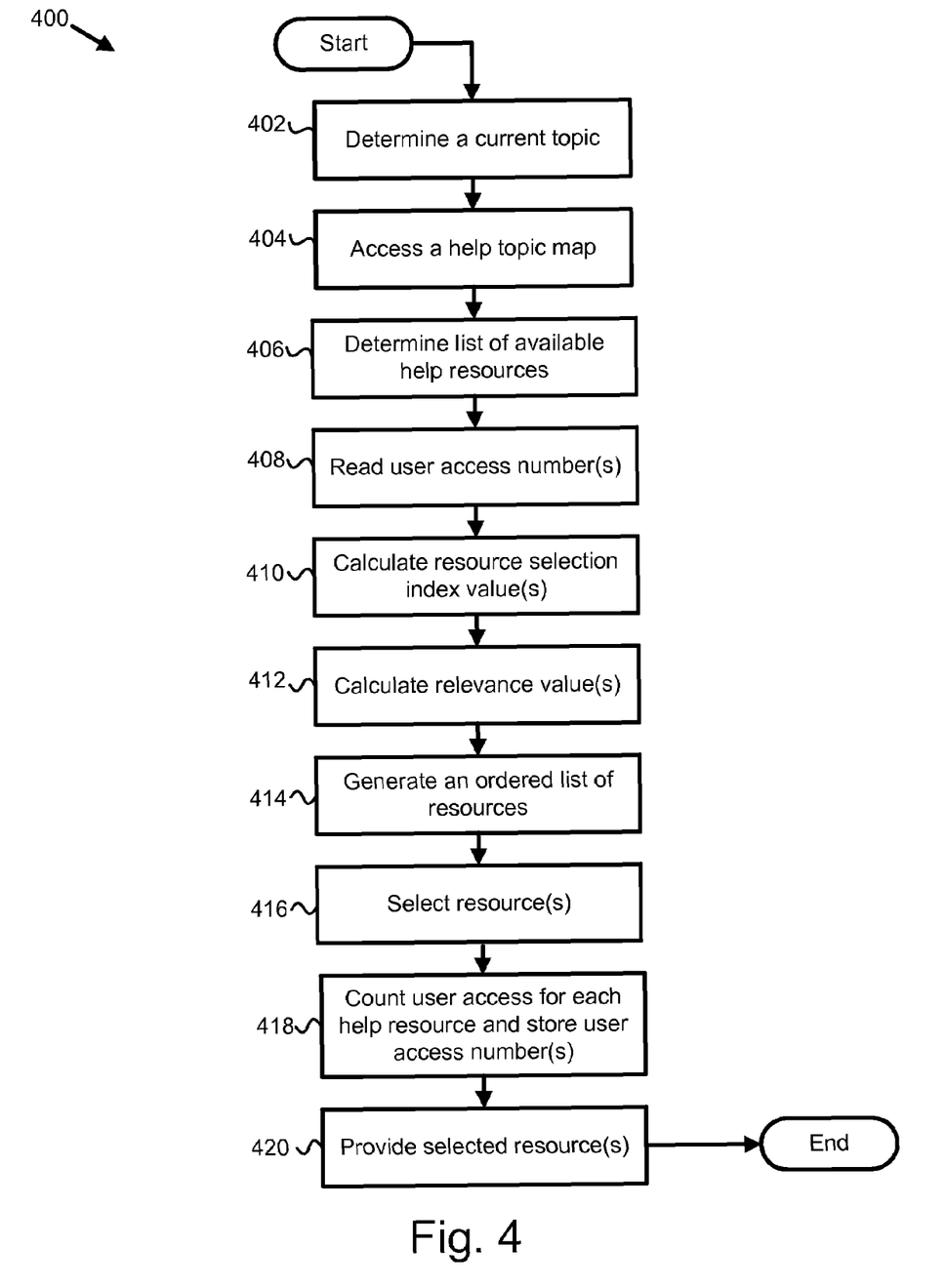
FIG. 4 is a schematic flow chart diagram illustrating one embodiment of a method to enhance help resource selection in accordance with the present invention.

FIG. 4 illustrates one embodiment of a method to enhance help resource selection in accordance with the present invention. The topic module 202 determines 402 a current topic 208. Then, the mapping module 204 accesses 404 a help topic map 222. The resource list module 206 determines 406 a list 210 of available help resources from the current topic 208 and help topic map 222. The method 400 may proceed with the resource tracking module 302 reading 408 user access numbers 316. The selection index module 314 may then calculate 410 a resource selection index value 308 for each help resource from the list 210 of available help resources.

The described embodiment of the method 400 may continue with the ordering module 310 calculating 412 relevance values 312 for each help resource from the list 210 of available help resources. The ordering module 310 may then generate 414 an ordered list 314 of help resources, sorted according to the relevance values 312 for each help resource. The resource selection module 216 may then select 416 at least one resource for user 102 access. The resource tracking module 302 may count 418 and store the user access in the user access number 316 for the selected resource 218. In one embodiment, the resource tracking module 302 may wait to count 418 a resource until the user 102 actively selects the resource for access, which occurs only after the user interface module 220 provides 420 the selected resource for user access.

Figure 5:
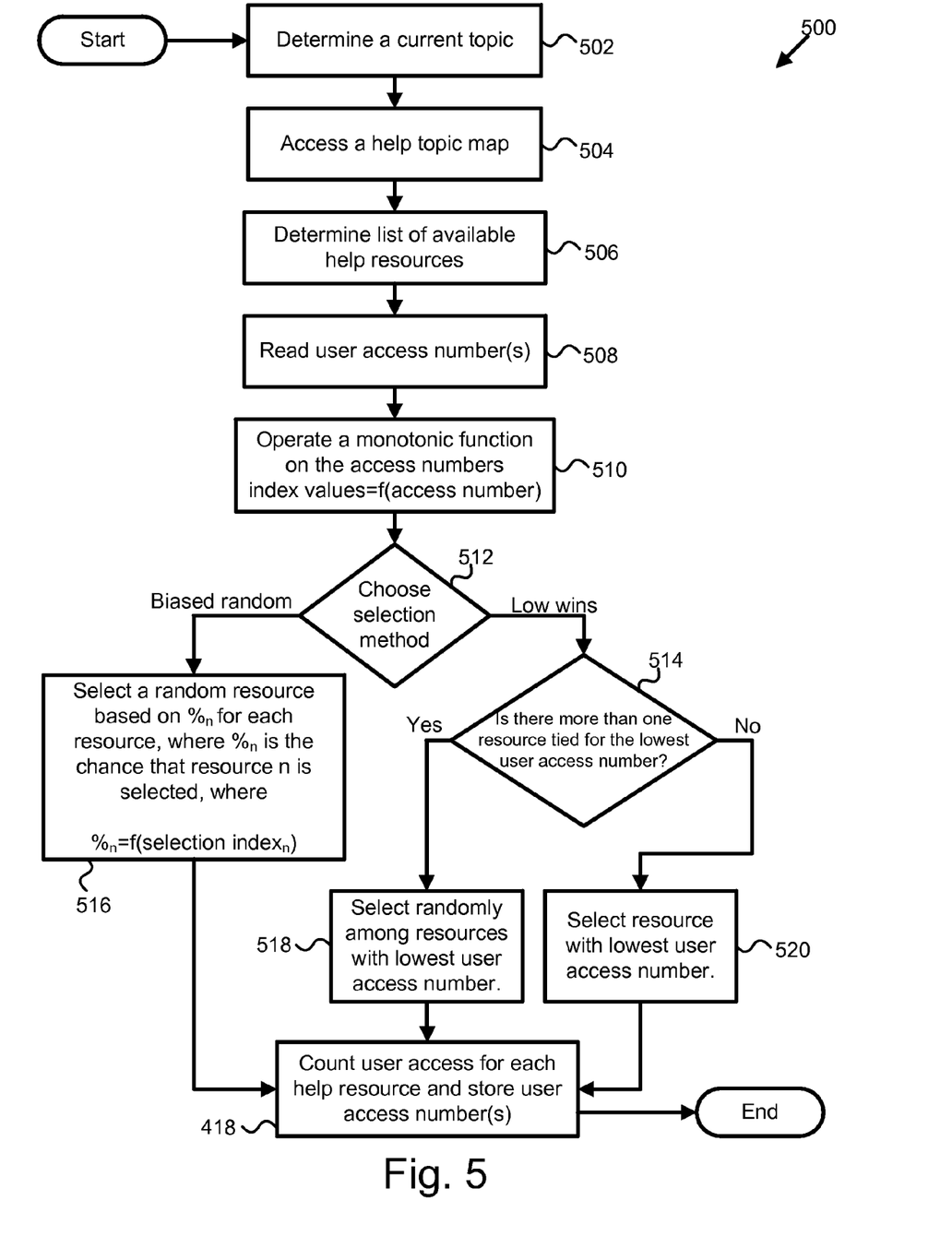
FIG. 5 is a schematic flow chart diagram illustrating an alternative embodiment of a method to enhance help resource selection in accordance with the present invention.

FIG. 5 illustrates one embodiment of a method to enhance help resource selection in accordance with the present invention. The topic module 202 determines 502 a current topic 208. Then, the mapping module 204 accesses 504 a help topic map 222. The resource list module 206 determines 506 a list 210 of available help resources from the current topic 208 and help topic map 222. The method 500 may proceed with the resource tracking module 302 reading 508 user access numbers 316. The selection index module 314 may then operate 510 a monotonic function 306 on the user access numbers 316 to generate selection index values 308.

The described embodiment of the method 500 may continue with the resource selection module 216 choosing 512 the appropriate selection method—"low wins" or "biased random." If the selection method is "biased random," the selection module 216 selects 516 a random resource, where the percentage chance for selecting each resource from the list 210 of available help resources is a function of the selection index value 308. One method of selecting 516 a biased random help resource is illustrated for clarity, although such methods are within the skill of one in the art, and all known methods are intended within the scope of the invention.

The illustrated selection method contemplates that a high selection index value 308 should indicate a high chance of selection—the practitioner arranges the monotonic function 306 such that help resources that are relatively more important to be selected receive a higher selection index value 308. The selection index value 308 might be set to index=10,000/(user access number), and the chance of selecting a given resource might be $index_i$/(sum of all indexes), where i indicates which help resource is being considered. Thus, if there were five help resources in the list 210 of available help resources, with user access numbers 316 of (5, 4, 10, 2, and 6), then those five help resources would have respective indexes 308 of (2,000, 2,500, 1,000, 5,000, and 1,667). In the example, the sum of all indexes 308 would be 12,167, and the percentages that each of the five help resources would be selected would be approximately (16.4%, 20.5%, 8.2%, 41.1%, and 13.7%) respectively.

One of skill in the art will readily recognize that this selection method requires special handling for the case where a user access number equals zero. In one embodiment, the zero access number 316 case is managed by automatically selecting a help resource with a user access number of zero, or selecting randomly between help resources where multiple help resources have a user access number of zero.

If the selection method is "low wins," the selection module 216 determines 514 if more than one help resource is tied for the lowest user access number 316. If there is a tie for the lowest user access number 316, the selection module 216 selects 518 randomly among those help resources with user access numbers 316 that are tied for the low. If there is no tie for the lowest, the selection module 216 selects the single help resource with the lowest user access number 316.

After the selection module selects 516, 518, 520 a help resource, the selection module 418 counts the user access for the appropriate help resource, and stores the new user access number 316.

Figure 6:
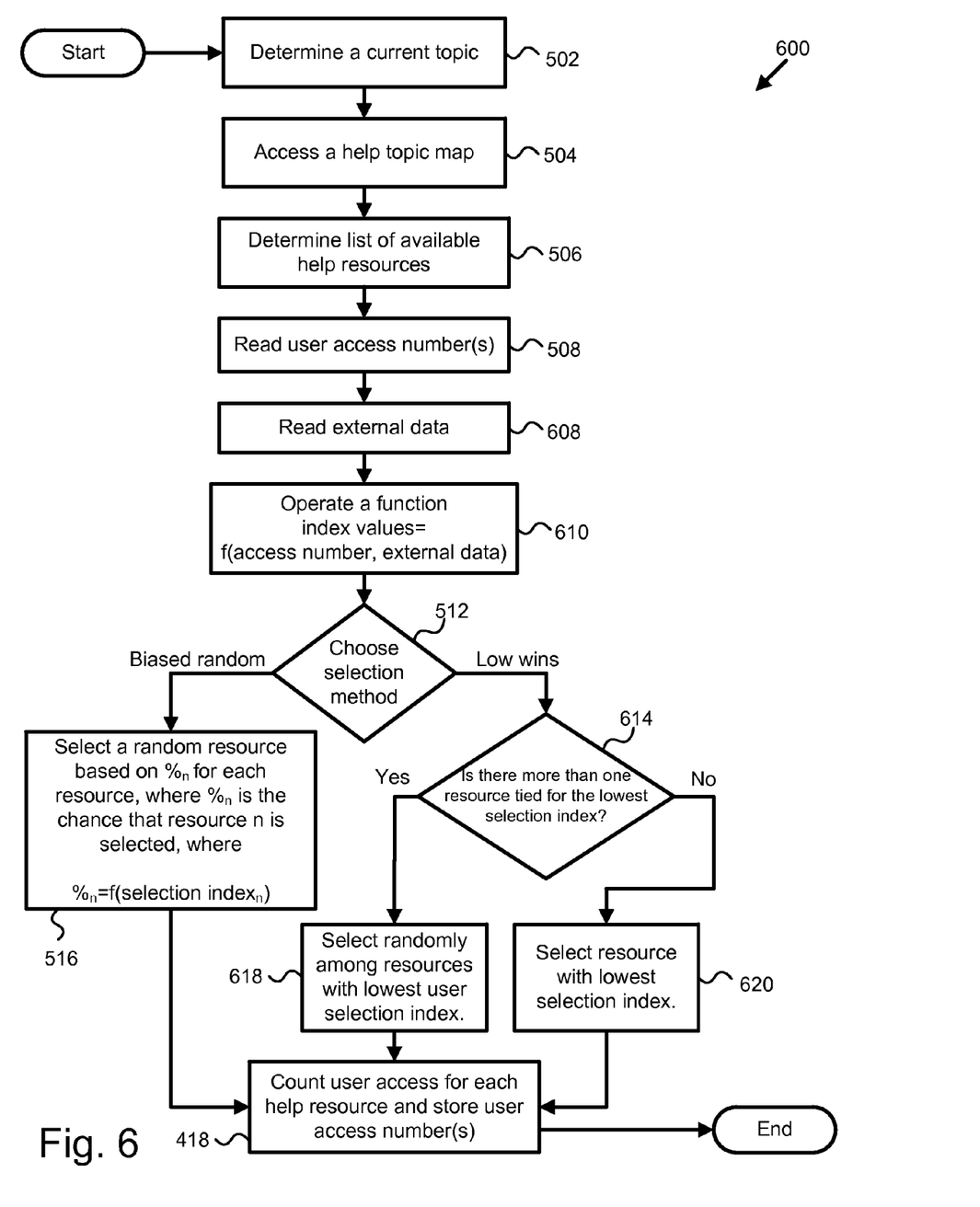
FIG. 6 is a schematic flow chart diagram illustrating an alternative embodiment of a method to enhance help resource selection in accordance with the present invention.

FIG. 6 illustrates one embodiment of a method to enhance help resource selection in accordance with the present invention. The reader should note that the only differences between the method 600 of FIG. 6 and the method 500 of FIG. 5 is that the method 600 uses the external data 318 rather than just the user access numbers 316, and the "low wins" logic of FIG. 6 is based on the selection index values 308 rather than just the user access numbers 316.

The topic module 202 determines 502 a current topic 208. Then, the mapping module 204 accesses 504 a help topic map 222. The resource list module 206 determines 506 a list 210 of available help resources from the current topic 208 and help topic map 222. The method 600 may proceed with the resource tracking module 302 reading 608 user access numbers 316, and with the supplemental data module 304 reading 608 external data 318. The selection index module 314 may then operate 610 a function on the user access numbers 316 and the external data 318 to generate selection index values 308.

The selection index value 308 may be a combination of the contributions of the user access numbers 316 and the external data 318. The combination may be additive, multiplicative, or discrete selection oriented. Where both the user access numbers 316 and the external data 318 are important considerations in most cases for whether a particular help resource should be selected, the contributions from each might be added together. Where the external data 318 tends to just enable or disable certain help resources as appropriate, then the multiplicative or discrete selection methods might be more helpful. An example of each method of combination is illustrated for clarity.

Figure 9A:
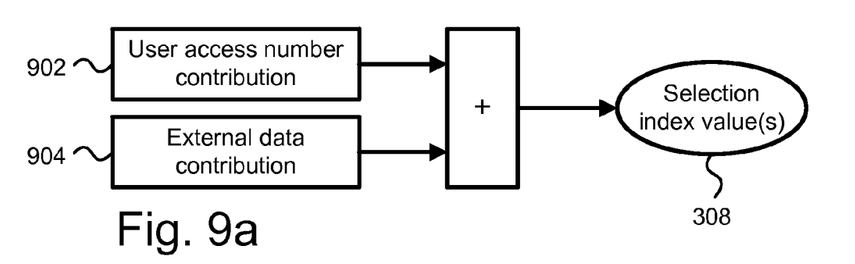
FIG. 9 illustrates several embodiments of methods to combine a selection index contribution from a user access number with a selection index contribution from external data.

The additive method is most useful where the external data 318 is a continuous variable of about the same order of magnitude as the user access number 316. For example, a user knowledge level on a scale of 1-100, or the number of times a user has accessed a closely related class of help resources might be good examples where a contribution from the external data 318 should be added to a contribution from the user access number 316 to generate 610 the selection index value 308. FIG. 9a shows a simple illustration of the additive method.

Figure 9B:
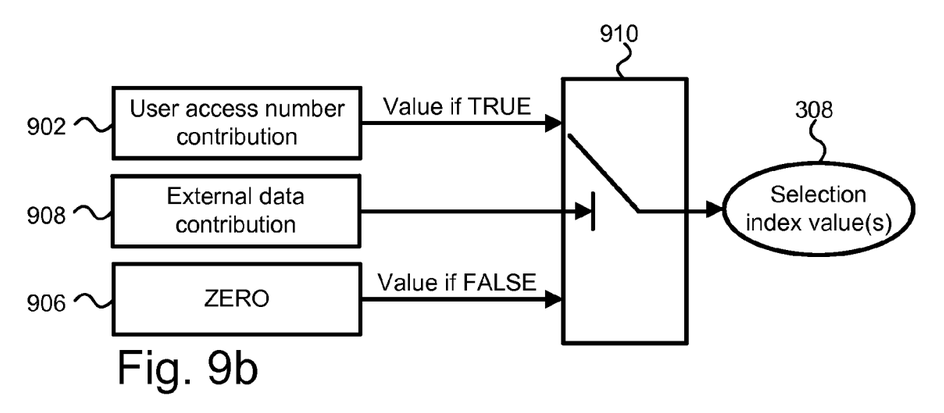

The discrete selection method is most useful where the external data 318 should be used to turn on or off certain help resources. For example, where the external data 318 indicates a user is an "expert," there could be a basic set of help resources that get disabled from the selection logic. Likewise, the selection logic could turn on certain help resources only when the external data 318 meets certain criteria. For example, if the external data 318 indicates the user is a "system administrator," the selection logic could allow certain help resources that would not be available to others. FIG. 9b shows a simple illustration of the discrete selection method.

Figure 9C:
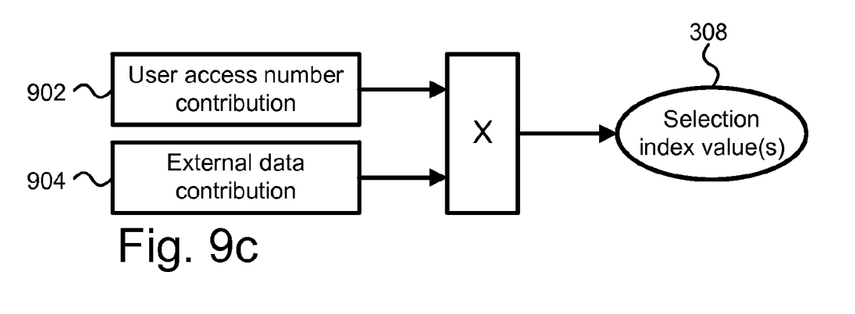

The multiplicative method is useful where the external data 318 should be used to turn on or off certain help resources, but should also have the capability to adjust the likelihood that help resources can be available without removing them from selection completely. For example, where the external data 318 indicates a user is an "expert," there could be a basic set of help resources that get disabled, in one instance, by a multiply by zero on the external data 318 contribution for those help resources. Likewise, an intermediate set of help resources might get a multiplier of 0.5, making them less likely to come up, but not disabling them completely. Thus, the method sets aside help resources that "expert" users should not need, but does not remove intermediate materials from selection completely. FIG. 9c shows a simple illustration of the multiplicative method.

After the operation 610 of the function to generate the selection index value, the rest of the method 600 is identical to the method 500, except that the decisions where the selection module 216 chooses 512 the "low wins," all determinations 614, 618, 620 are made from the selection index value 308 rather than the user access number 316.

Figure 7:
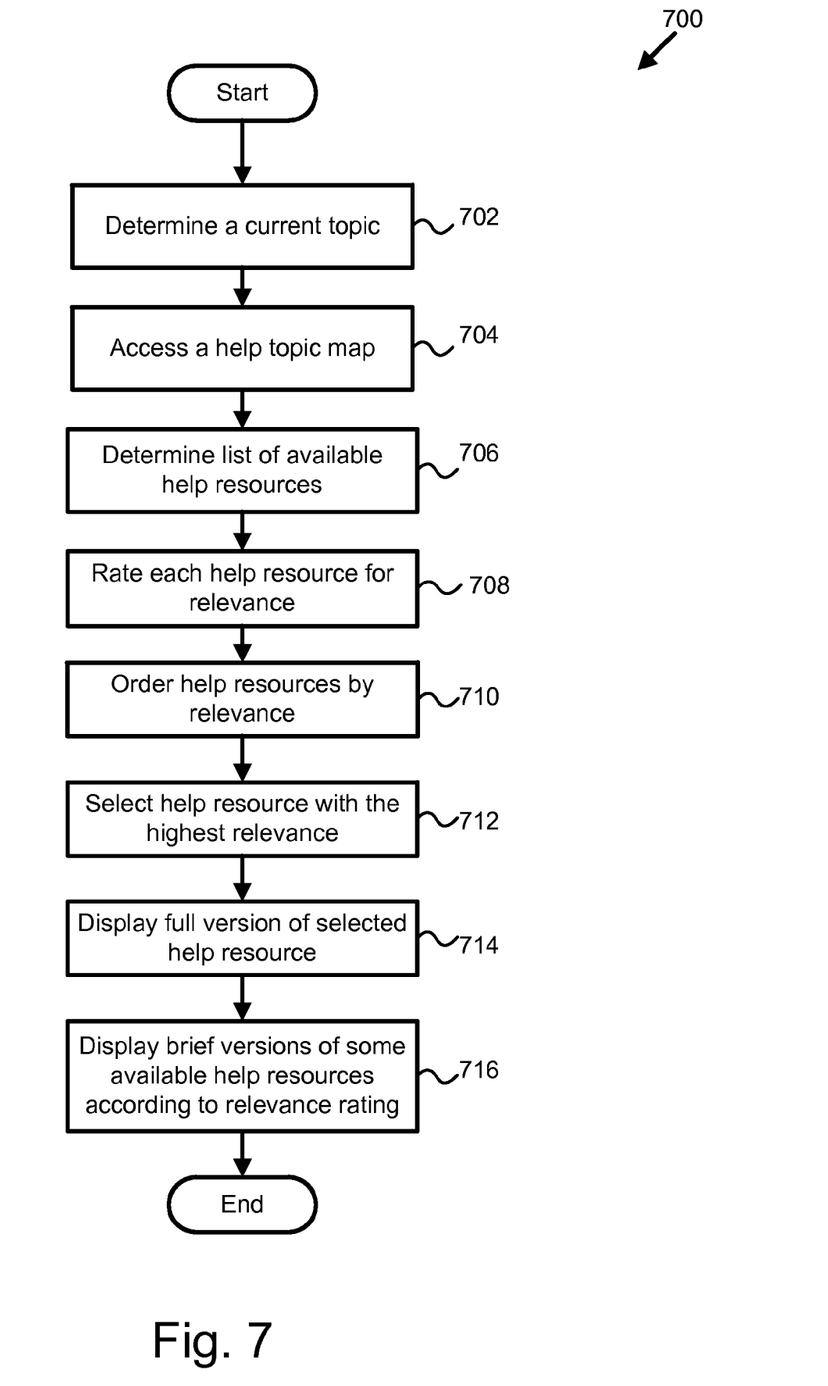
FIG. 7 is a schematic flow chart diagram illustrating an alternative embodiment of a method to enhance help resource selection in accordance with the present invention.

FIG. 7 illustrates one embodiment of a method 700 of enhancing help resource selection in accordance with the present invention. The topic module 202 determines 702 a current topic 208. The mapping module 204 accesses 704 a help topic map 222. The resource list module 206 combines the current topic 208 and help topic map 222 to determine 706 a list of available help resources.

The method 700 may continue with an ordering module 310 rating 708 each available help resource for relevance, and ordering 710 the help resources by relevance. Then the selection module 216 selects 712 the help resource with the highest relevance. The user interface module 220 displays 714 the full version of the help resource with the highest relevance to the user 102. The user interface module 220 displays 716 a brief version of some of the available help resources. In one embodiment, the user interface module 220 displays 716 the several most relevant resources as a hyperlink where the user 102 can easily access the full version of those help resources.

FIG. 8 illustrates an embodiment of several data items in accordance with the invention.

One example first instance 802 of a user access number 316 is shown. In the example, the first access number instance 802 comprises a help resource identifier 804, a user identifier 806, and the number of times the user 102 has accessed the identified help resource 808.

One example second instance 810 of a user access number 316 is shown, where the user access to help resource-topic pairs are tracked. This would help the practitioner calculate a set of resource selection index values 308 for each help resource, where each resource selection index value 308 of the set corresponds to one of the topics related to the help resource as indicated by the help topic map 222. The second access number instance 810 comprises a help resource identifier 812, a user identifier 814, a related topics list 816, a resource-topic pair list 818, and a set of access numbers 820. To calculate a set of selection index values 308 for the identified help resource 812, the selection index function 306, 510, 612 would be operated on each access number 820.

One example instance 822 of a help topic map 222 is shown. The map instance 822 comprises a help resource list 824, a topic list 826, and a resource to topic map 828, 830. To illustrate the use of the map instance 822, a current topic 832 is displayed. Where the current topic 832 is "A", the resource to topic map 828, 830 indicates that the help resource available list 834 comprises the help resources "1," "4," and "6."

One example instance 836 of a user skill set list from external data 318 is shown. The external data instance 836 comprises a user identification 837, a skill identification list 838, and lists of skill levels labeled "None" 840, "Aware" 842, "User" 844, and "Expert" 846. In the example, the user 837 shows a skill level 840 of "None" in skill "1" 838. Building similar types of data structures for the external data 318 explicitly listed in FIG. 3, as well as other types of external data, are mechanical steps within the skill of one in the art.

FIG. 9 illustrates several embodiments of various methods combining a user access number contribution 902 with an external data contribution 904, 908 to determine a selection index value 308.

FIG. 9a shows one embodiment of using the additive method (See FIG. 6) for combining a user access number contribution 902 with an external data contribution 904 to determine a selection index value 308.

FIG. 9b shows one embodiment of using the discrete solution method for combining a user access number contribution 902 with an external data contribution 908 to determine a selection index value 308. The external data contribution 908 is a BOOLEAN value of true or false. The logic block 910 provides the input at the top—the user access number contribution 902 in the example—when the external data contribution 908 is TRUE, and the logic block 910 provides the input at the bottom—ZERO 906 in the example—when the external data contribution 908 is FALSE. Therefore, for the present example, the selection index value 308 is either the user access number contribution 902 or ZERO 906.

FIG. 9c shows one embodiment of using the multiplicative method (see FIG. 6) for combining a user access number contribution 902 with an external data contribution 904 to determine a selection index value 308.

It is within the skill of one in the art to combine and extend the basic methods of combining the user access number contribution 902 and the external data contribution 904. Thus, the building blocks are in place to create selection index values based on power functions, polynomials, and neural networks. Without other limitation, all of these are contemplated within the scope of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to enhance help resource selection, the apparatus comprising:

a topic module comprising executable code stored on a storage device, executed by a processor, and configured to determine a current topic;

a mapping module comprising executable code stored on the storage device, executed by the processor, and configured to access a help topic map;

a resource list module comprising executable code stored on the storage device, executed by the processor, and configured to determine a list of available help resources from the help topic map based on the current topic;

a selection logic module comprising executable code stored on the storage device, executed by the processor, and configured to select at least one help resource, the selection module further comprising a resource tracking module comprising executable code stored on the storage device, executed by the processor, and that counts user accesses for each help resource and stores a corresponding list of help resource user access numbers, the selection logic module comprising a selection index module comprising executable code stored on the storage device, executed by the processor, and configured to calculate at least one resource selection index value for each help resource in the list of available help resources by operating a first function on the help resource user access count and external data to generate resource selection index values such that the generated resource selection index values monotonically relate to the estimated relevance of each help resource, the first function comprising an equation selection index value=10,000/n where n is the number of user accesses, the external data comprising a user knowledge value, a user skill set list, a user job code, and a user certification list, the selection logic module further comprising a resource selection module comprising executable code stored on the storage device, executed by the processor, and configured to select at least one help resource from the list of available help resources based on the at least one resource selection index value; and a user interface module comprising executable code stored on the storage device, executed by the processor, and configured to provide the at least one selected help resource for access by a user.

2. The apparatus of claim 1, the selection logic module further comprising an ordering module comprising executable code stored on the storage device, executed by the processor, and configured to determine a relevance value for each help resource from the list of available help resources by calculating the relevance value based on the at least one resource selection index value, and to generate an ordered list of available help resources based on the relevance value for each help resource from the list of available help resources.

3. The apparatus of claim 1, wherein the resource selection module is further configured to select the at least one help resource by making a biased random selection, such that help resources corresponding to resource selection index values indicating a high number of user accesses have a lower chance of selection than help resources corresponding to resource selection index values indicating a low number of user accesses.

4. The apparatus of claim 1, wherein the resource selection module is further configured to select the at least one help resource by making a biased random selection, such that help resources corresponding to resource selection index values indicating greater estimated relevance have a higher chance of selection than help resources corresponding to resource selection index values indicating lesser estimated relevance.

* * * * *